United States Patent [19]

Eddy

[11] Patent Number: 5,414,021

[45] Date of Patent: * May 9, 1995

[54] METHOD FOR SALVAGING AROMATIC POLYCARBONATE BLEND VALUES

[75] Inventor: Victoria J. Eddy, Scotia, N.Y.

[73] Assignee: General Electric Company, Schenectady, N.Y.

[*] Notice: The portion of the term of this patent subsequent to Aug. 23, 2011 has been disclaimed.

[21] Appl. No.: 100,392

[22] Filed: Aug. 2, 1993

[51] Int. Cl.⁶ .............................................. C08J 11/04
[52] U.S. Cl. .................................... 521/48; 521/40; 521/40.5; 528/196
[58] Field of Search ............ 521/40, 40.5, 48; 528/196

[56] References Cited

U.S. PATENT DOCUMENTS

| | | | |
|---|---|---|---|
| 4,212,774 | 7/1980 | Idel | 528/196 |
| 4,267,096 | 5/1981 | Bussink et al. | 524/505 |
| 4,568,712 | 2/1986 | Van Abeelen et al. | 524/267 |
| 4,654,400 | 3/1987 | Lohmeijer et al. | 525/64 |
| 5,214,072 | 5/1993 | Fennhoff et al. | 521/48 |

FOREIGN PATENT DOCUMENTS 3511711 10/1986 Germany ................ 521/40

*Primary Examiner*—Paul R. Michl
*Assistant Examiner*—Olga Asinovsky
*Attorney, Agent, or Firm*—William A. Teoli; William H. Pittman

[57] ABSTRACT

A method is provided for effecting the removal of cured polyurethane paint from the surface of aromatic polycarbonate blend surfaces. Effective removal of thermally cured polyurethane paint from aromatic polycarbonate blend surface can be achieved by immersing the painted aromatic polycarbonate blend in an aqueous bath containing organic solvent, an alkali metal hydroxide and a surfactant.

6 Claims, No Drawings

METHOD FOR SALVAGING AROMATIC POLYCARBONATE BLEND VALUES

BACKGROUND OF THE INVENTION

The present invention relates to a method for salvaging aromatic polymeric values, such as polycarbonate blend values from painted aromatic polycarbonate blend surfaces. More particularly, the present invention relates to the use of an aqueous bath containing an organic solvent, an alkali metal hydroxide, or alkaline earth metal hydroxide and an effective amount of a surfactant to effect the removal of thermally cured polyurethane paint from the surface of a molded blend of aromatic polycarbonate and aromatic polyester.

There is shown by Bussink et al, U.S. Pat. No. 4,267,096, molded blends of aromatic polycarbonate, amorphous aromatic polyester and a hydrogenated block copolymer of a vinyl aromatic compound and a diolefin. These molded blends exhibit high impact strength and resistance to melt flow, environmental stress crazing and crack resistance. The use of molded blends of aromatic polycarbonate and aromatic polyester in high impact applications, such as automobile bumpers, are shown by Van Abeelen et al, U.S. Pat. No. 4,568,712 and Lohmeijer et al, U.S. Pat. No. 4,654,400. After molding, the plastic bumper is often painted with a thermally curable polyurethane paint.

In most instances, used painted bumpers are discarded. These rejected articles cannot be readily recycled because it has been found difficult to remove the thermally cured polyurethane paint. Attempts to extrude such paint containing thermoplastic material which has been granulated, can result in the decomposition of the polyurethane paint to form hexamethylene diisocyanate, a toxic compound. Extrusion in the presence of the polyurethane paint also can adversely affect the performance of any resulting remolded part, since paint residues can concentrate stress and diminish physical properties.

Mechanical methods for the direct removal of paint from thermoplastic surfaces, such as by sandblasting, or with pressurized $CO_2$ have been shown to be environmentally and economically unattractive. In copending application Ser. No. 07/981,668, filed Nov. 25, 1992, a method is described for removing silicone hardcoats from polycarbonate substrates utilizing a 50% aqueous caustic solution in combination with isopropanol. Efforts to use this procedure for painted thermoplastic bumpers have been found to result in only the partial removal of thermally cured polyurethane paint from the surface of painted aromatic polycarbonate parts.

SUMMARY OF THE INVENTION

The present invention is based on the discovery that total removal of thermally cured polyurethane paint from the surface of molded blends of aromatic polycarbonate and aromatic polyester can be effected with an aqueous caustic alkanol solution containing an effective amount of a surfactant. Total removal of thermally cured polyurethane paint from molded aromatic polycarbonate blend surfaces can be confirmed both visually and spectrally. Further confirmation of complete polyurethane paint removal from aromatic polycarbonate blend surfaces can be shown by directly comparing the physical properties of the restored aromatic polycarbonate blends with the physical properties of a comparable aromatic polycarbonate virgin blend.

STATEMENT OF THE INVENTION

There is provided by the present invention, a method for salvaging aromatic polycarbonate blend values from an aromatic polycarbonate blend substrate which has been treated with a thermally cured polyurethane paint, which method comprises, (1) contacting the painted aromatic polycarbonate blend substrate in a paint removal bath at a temperature of 20° C. to 100° C. and at a pH of 10 to 14 for a period of time which is at least sufficient to effect the substantial deprotonation of available phenolic and alcohol groups in the mixture, (2) removing the treated aromatic polycarbonate blend substrate from the mixture of (1), and (3) rinsing the treated aromatic polycarbonate blend substrate with an aqueous solution having a pH of less than 7 until the pH of the resulting run-off rinse water has stabilized in the range of 4 to 7, where the paint removal bath comprises by weight, 50 to 95% water, 5 to 30% of an organic solvent, an effective amount of a surfactant, and at least 2% by weight, based on the weight of the paint removal bath, of an hydroxide selected from the group consisting of alkali metals, ammonium, tetraalkylammonium, and alkaline earth metals.

Although blends of aromatic polycarbonate and aromatic polyester are preferably treated in accordance with the practice of the method of this invention, other blends of aromatic polycarbonate in combination with other thermoplastics, such as polyaryleneether and acrylonitrile-butadiene-styrene blends are also contemplated. Additional thermoplastic materials having an elastomeric core also can be used. A typical formulation is, for example, a blend comprising, (a) 30–70% by weight of aromatic polycarbonate;
(b) 20–60% by weight of aromatic polyester;
(c) 5–15% by weight of a polymer having an elastomeric core which comprises one or more alkyl acrylates or aralkyl acrylates, a cross-linking agent, and a grafting agent and having a rigid thermoplastic envelope.

Another variation of the aromatic polycarbonate blend is shown by Bussink, U.S. Pat. No. 4,267,096, incorporated herein by reference.

The aromatic polycarbonate component of the molded thermoplastic blend can be an aromatic polycarbonate of a dihydric phenol and a carbonate precursor such as phosgene, a haloformate or a carbonate ester. Generally speaking, such aromatic carbonate polymers may be typified as possessing recurring structural units of the formula,

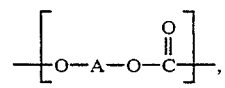

wherein A is a divalent aromatic radical of a dihydric phenol employed in the polymer producing reaction. Preferably, the polycarbonate polymers used have an intrinsic viscosity (as measured in p-dioxane in deciliters per gram at 30° C.) ranging from about 0.35 to about 0.75. The dihydric phenols which may be employed to provide such aromatic polycarbonate polymers are mononuclear and polynuclear aromatic compounds, containing as functional groups, 2 hydroxy radicals, each of which is attached directly to a carbon atom of an aromatic nucleus. Illustrative dihydric phenols are 2,2-bis(4-hydroxyphenyl)propane (Bisphenol-A); hydroquinone; resorcinol; 2,2-bis-(4-hydroxyphenylpentane; 2,4'-dihydroxydiphenyl methane; bis-(2-hydroxyphenyl)methane; bis-(4-hydroxyphenyl)methane; bis-(4-hydroxy-5-nitrophenyl)methane; 1.1-bis(4-hydroxyphenyl)ethane; 3,3-bis-(hydroxyphenyl)pentane; 2,2'-dihydroxydiphenyl; 2,6-dihydroxy naphthalene; bis-(4-hydroxyphenyl sulfone); 2,4'-dihydroxydiphenyl)sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4'-dihydroxy-2,5-diethoxydiphenyl ether; 2,2-bis-(3,5-dichloro-4-hydroxyphenyl)propane; 2,2-bis-(3,5-dibromo-4-hydroxyphenyl)propane; 2,2-bis(3,5-dimethyl-4-hydroxy phenyl)propane; and the like.

Additional dihydric phenols which may be employed to provide aromatic polycarbonate polymers are disclosed in Goldberg, U.S. Pat. No. 2,999,835. It is, of course, known to employ two or more different dihydric phenols or a dihydric phenol in combination with a glycol, a hydroxy terminated polyester, or a dibasic acid in the event that an aromatic polycarbonate copolymer rather than a homopolymer, e.g., bisphenol A and tetrabromobisphenol A with flame retardant properties.

When a carbonate ester is used as the carbonate precursor in the polymer forming reaction, the materials can be reacted at temperatures of from 100° C. or higher for times varying from 1 to 15 hours. Under such conditions, ester interchange occurs between the carbonate ester and the dihydric phenol used. Ester interchange can be effected at pressures of from about 10 to about 100 mm of mercury, preferably in an inert atmosphere, such as nitrogen or argon, for example.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di(tolyl) carbonate.

Generally speaking, a haloformate such as the bishaloformate of 2,2-bis-(4-hydroxyphenyl)propane may be substituted for phosgene as the carbonate precursor in any of the methods described above.

Amorphous aromatic polyesters, such as poly(alkylene terephthalates), are often blended with aromatic polycarbonates to make materials having a low tendency to crystallize; these blends provide smooth extrusions, and easy stranding, without excessive die swell.

The use of amorphous poly(alkylene terephthalates) or polyesters can comprise the reaction product of an alkylene glycol, e.g. or glycols of from 2 to 10 carbon atoms, and a dicarboxylic acid, preferably aromatic in nature, and especially preferably a terephthalic or isophthalic acid, or reactive derivative thereof. The glycol can be selected from ethylene glycol, propylene glycol, 1,4-butanediol, 1,4-cyclohexane dimethanol, 1,10-decamethylene glycol, and the like. Although scrupulous freedom from nucleating agents provides poly(ethylene terephthalate) with a low degree of crystallinity, it is preferred to prepare or use copolyesters of the poly(alkylene terephthalate) type which contain, incorporated at random in the chain, small amounts of dissimilar units (0.5–5%) in order to break down any tendency whatever for the "100%" pure polyester to crystallize. The use of a small amount of isophthalic acid instead of terephthalic acid 100% will also produce amorphous polyesters. The predominant polymer can be made from a single one of ethylene glycol, 1,4-butanediol, 1,4-cyclohexanedimethanol, and the like, and the minor amount of second glycol can comprise a different one of the three enumerated or propylene glycol, 1,6-hexanediol, and the like. Preferably, the polyester will be an amorphous poly(ethylene terephthalate) copolyester, an amorphous poly (1,4-butylene terephthalate) copolyester; or an amorphous poly (1,4-cyclohexane dimethylene terephthalate) copolyester. Especially preferred is an amorphous poly(ethylene terephthalate). One suitable form is available from Akzo Industries under the trade designation ARNITE A04-1032.

As mentioned above, other additives may be present in the blends, such as pigments, e.g., titanium dioxide, flame retardants, and foaming agents, e.g., 5-phenyltetrazole, etc. All of the additions can be present in amounts varying between about 0.1 and 100 parts by weight of the total resinous components.

Reinforcing materials, such as powders, whiskers, fibers or platelets of metals, e.g, aluminum, bronze, iron or nickel, and non-metals, e.g., carbon filaments, acicular $CaSiO_3$ asbestos, $TiO_2$, titanate whiskers, glass flakes and the like also can be present.

There also can be present stabilizers, such as phosphites, phosphates, epoxides, and the like, either in combination or individually, depending on the end use.

The thermally cured polyurethane paint which can be removed in the practice of the present invention can be derived from a paint formulation having such typical ingredients as butylacetate, hexamethylene diisocyanate, poly(hexamethylene dissocyanate), ethyl benzene and mixed dimethylbenzene isomers.

Alkali and alkaline earyh hydroxides which can be used in the paint removal bath to achieve an effective pH include hydroxides of alkali metals, such as, lithium, cesium, rubidium, calcium, sodium and potassium, and hydroxides of ammonium, or tetraalkylammonium, for example tetramethylammonium and tetrabutylammonium. These alkaline materials can be used in the form of aqueous solutions at a concentration of 2 to 40% by weight and preferably 5 to 15% by weight.

Effective paint removal results can be achieved if the painted aromatic polycarbonate blend substrate is exposed to the paint removal bath for a period of at least 5 minutes, and preferably 20 to 60 minutes employing an agitator, such as a stirrer. A bath temperature in the range of 20° C. to 100° C. can be used, and preferably 65° C. to 75° C.

Surfactants which can be used are preferably anionic, and more particularly mono or di $C_{(10)}$ alkylated diphenyl ether disulfonates. These aqueous mixtures can consist of about 45% by weight of active solids and about 55% water. A preferred surfactant is Dowfax 3B2 of the Dow Chemical Company, Midland, Mich. An effective amount of surfactant is about 0.02% to 2% by weight of surfactant, based on the weight of the treating bath.

Organic solvents which can be used in the paint removal bath are for example, methanol, ethanol, propanol, isopropanol, butanol, t-butanol, isobutanol, and pentanol.

In order that those skilled in the art will be better able to practice the invention, the following example is given by way of illustration and not by way of limitation. All parts are by weight.

Example 1

Several used thermoplastic bumper parts were collected which had been painted with a polyurethane paint. The bumper parts were polyurethane painted aromatic polycarbonate blends consisting of about 46% by weight of bisphenol A polycarbonate, 39% by weight of polybutylene terephthalate and about 14% by weight of a blend of methyl methacrylate and butadiene styrene copolymer. Certain painted parts evaluated had an adhesive residue on a portion of their surface. The various painted thermoplastic parts were washed free of surface dirt. The adhesive residue still remained on some of the thermoplastic parts. The various thermoplastic parts, with and without adhesive residue were then pelletized. Approximately 6 kilograms of the respective pellets were then treated in a 10 gallon Brighton reactor by contacting the pellets with a treating both containing 2.5 kilograms of isopropanol, 2.5 kilograms of sodium hydroxide as a 50 weight % aqueous solution, 17.5 kilograms of deionized water and 250 grams of Dowfax 3B2, a surfactant of the Dow Chemical Co., of Midland Mich. The mixture was agitated and warmed to 70° C. over a period of 1 hour. After an additional 25 minutes at 70° C., the mixture was cooled rapidly to below 35° C. The pellets were then removed from the reactor, dried and rinsed in a centrifuge to effect the removal of paint residues. The pellets were then rinsed with a 2% hydrochloric acid to protonate all the phenolic and alcohol groups on the pellets. The pellets were then dried and molded to produce test samples. Test samples were also made from pellets derived from washed painted bisphenol A polycarbonate blend, as defined above which had not been subjected to the bath treatment (untreated). Test samples also were made from unpainted polycarbonate blend as defined above (virgin). The respective test samples were then evaluated for physical properties. The following results were obtained where "treated" means the pellets had been subjected to the bath treatment:

TABLE 1

| | PHYSICAL PROPERTIES | | | |
|---|---|---|---|---|
| Description | Adhesive residue | Izod Impact (ft.lbs.) | Modulus (psi) | Elongation (%) |
| Virgin pellets | no | 13.0(0.5) | 128600 (3730) | 240(10) |
| treated pellets | yes | 12.8(1.0) | 132900 (3154) | 118(67) |
| treated pellets | no | 12.6(0.5) | 132500 (2982) | 159(44) |
| untreated pellets | yes | 7.1(0.7) | 142100 (666) | 12(0.74) |

TABLE 1-continued

The above results show that the paint removal bath method of the present invention provides moldable thermoplastic polycarbonate blends which are substantially equivalent to virgin thermoplastic polycarbonate blend.

Although the above example is directed to only a few of the very many variables of the method of the present invention, it should be understood that the present invention is directed to the use of a much braoder variety of components and conditions as shown in the description preceding this example.

What is claimed is:

1. A method for salvaging aromatic polycarbonate blend values from an aromatic polycarbonate blend substrate, surface treated with a thermally cured polyurethane paint, which method comprises, (1) contacting the polyurethane painted aromatic polycarbonate blend substrate in a paint removal bath at a temperature of 20° C. to 100° C. and at a pH of 10 to 14 for a period of time which is at least sufficient to effect the substantial deprotonation of available phenolic and alcohol groups in the mixture, (2) removing the treated aromatic polycarbonate blend substrate from the mixture of (1), and (3) rinsing the treated aromatic polycarbonate blend substrate with an aqueous solution having a pH of less than 7 until the pH of the resulting run-off rinse water has stabilized in the range of 4 to 7, where the paint removal bath comprises by weight, 50 to 95% water, 5 to 30% of an organic solvent, and based on the weight of the paint removal bath, an effective amount of a surfactant, and at least 2% by weight of an hydroxide selected from the group consisting of alkali metals, ammonium, tetraalkylammonium, and alkaline earth metals.

2. A method in accordance with claim 1, where the aromatic polycarbonate blend is a blend of an aromatic polycarbonate and aromatic polyester.

3. A method in accordance with claim 2, where the aromatic polycarbonate is a bisphenol A polycarbonate.

4. A method in accordance with claim 1, where the aromatic polycarbonate blend is a blend of bisphenol A polycarbonate and a polybutylene terephthalate.

5. A method in accordance with claim 1, where the surfactant is an anionic mono or di $C_{(10)}$ alkylated diphenyl diether disulfonate.

6. A method in accordance with claim 1, where the alkali metal hydroxide is sodium hydroxide.

* * * * *